US010952413B2

(12) United States Patent
Greco

(10) Patent No.: US 10,952,413 B2
(45) Date of Patent: Mar. 23, 2021

(54) AQUARIUM FAÇADE ASSEMBLY WITH ENCASED FAUX HUMAN HEAD

(71) Applicant: Dominick Michael Greco, Tamarac, FL (US)

(72) Inventor: Dominick Michael Greco, Tamarac, FL (US)

( * ) Notice: Subject to any disclaimer, the term of this patent is extended or adjusted under 35 U.S.C. 154(b) by 154 days.

(21) Appl. No.: 16/204,743

(22) Filed: Nov. 29, 2018

(65) Prior Publication Data

US 2020/0170228 A1     Jun. 4, 2020

(51) Int. Cl.
*A01K 63/06* (2006.01)
*A01K 63/00* (2017.01)

(52) U.S. Cl.
CPC ............ *A01K 63/006* (2013.01); *A01K 63/06* (2013.01)

(58) Field of Classification Search
CPC .............................. A01K 63/06; A01K 63/006
USPC ......................................................... 119/253
See application file for complete search history.

(56) References Cited

U.S. PATENT DOCUMENTS

| | | | | |
|---|---|---|---|---|
| 3,841,267 A | * | 10/1974 | Miller ................. | A01K 63/06 119/266 |
| 4,920,922 A | * | 5/1990 | Tominaga ............ | A01K 63/006 119/265 |
| 5,040,488 A | * | 8/1991 | Hwang ................ | A01K 63/003 119/202 |
| 5,090,357 A | * | 2/1992 | Pucci .................. | A01K 63/006 119/256 |
| 5,211,469 A | * | 5/1993 | Matthias ............. | A01K 63/06 362/101 |
| 5,353,746 A | * | 10/1994 | Del Rosario ........ | A01K 63/06 119/266 |

(Continued)

FOREIGN PATENT DOCUMENTS

| | | | | |
|---|---|---|---|---|
| CA | 2299927 A1 | * | 9/2000 | ........... A01K 63/006 |
| CA | 3043014 A1 | * | 5/2018 | ........... A01K 63/047 |

(Continued)

OTHER PUBLICATIONS

The Walking Dead. (Dec. 13, 2013). The Walking Dead Zombie Head Aquarium. Retrieved from YouTube: https://www.youtube.com/watch?v=GyXCoG1-je0.*

*Primary Examiner* — Monica L Barlow
*Assistant Examiner* — Aaron M Rodziwicz
(74) *Attorney, Agent, or Firm* — Mark C. Johnson; Johnson Dalal

(57) ABSTRACT

An aquarium façade assembly with encased faux human head creates an animated visual effect through use of a transparent sidewalls; a base with a mirror finish; LEDs shining on the mirror finish; a front façade chamber containing an aerated, bubbling liquid; and a suspended, yet moving faux human head. An aerator, an air tube, and a liquid fill-drain aperture enhance aeration, circulation, and drainage for the liquid contained in the front façade chamber, to enhance the visual effect of the faux human head. A passive infrared sensor detects motion near the front sidewall, and actuates motion of the faux human head through a cable, pulley, and shaft mechanism. Magnets in the base and cover of the aquarium assembly generate a magnetic field throughout the aquarium cavity. The magnetic field causes metallic materials integrated in the faux human head to gyrate, causing the head to gyrate accordingly.

20 Claims, 20 Drawing Sheets

(56) References Cited

U.S. PATENT DOCUMENTS

| | | | |
|---|---|---|---|
| 5,649,757 A * | 7/1997 | Aleman | A01K 63/06 119/266 |
| 5,685,096 A | 11/1997 | Horiuchi | |
| 5,749,320 A * | 5/1998 | Sydenstricker | A01K 63/006 119/253 |
| 6,193,578 B1 | 2/2001 | Weber | |
| 6,742,477 B1 * | 6/2004 | Marraudino | A01K 63/006 119/256 |
| 7,497,039 B2 | 3/2009 | Zhu et al. | |
| 7,500,776 B1 * | 3/2009 | Buczko | A01K 63/06 119/267 |
| 7,543,952 B1 * | 6/2009 | Chang | A01K 63/06 362/101 |
| 7,833,106 B2 | 11/2010 | Zhu | |
| 8,132,532 B1 * | 3/2012 | Grundig | A01K 63/006 119/245 |
| 2002/0083901 A1 * | 7/2002 | Rudolph | A01K 63/006 119/256 |
| 2004/0264191 A1 * | 12/2004 | Takano | F21V 19/0095 362/267 |
| 2005/0034677 A1 * | 2/2005 | Blake | A01K 63/006 119/266 |
| 2005/0135104 A1 * | 6/2005 | Crabb | H05B 45/37 362/276 |
| 2006/0271340 A1 * | 11/2006 | Levine | A01K 63/06 702/188 |
| 2007/0051321 A1 * | 3/2007 | Chang | A01K 63/006 119/266 |
| 2007/0101942 A1 * | 5/2007 | Smith | A01K 63/006 119/253 |
| 2008/0266836 A1 * | 10/2008 | Hadley | A01K 63/06 362/101 |
| 2008/0290816 A1 * | 11/2008 | Chen | A01K 63/06 315/294 |
| 2009/0147502 A1 * | 6/2009 | Aleman | A47F 3/001 362/101 |
| 2009/0161347 A1 * | 6/2009 | Teng | A01K 63/065 362/101 |
| 2009/0190336 A1 * | 7/2009 | Teng | A01K 63/06 362/154 |
| 2011/0048332 A1 * | 3/2011 | Lee | A01K 63/06 119/253 |
| 2011/0168102 A1 * | 7/2011 | Kilroy | A01K 63/006 119/246 |
| 2014/0261216 A1 * | 9/2014 | Fosburg | A01K 63/06 119/267 |
| 2017/0290307 A1 * | 10/2017 | Boschert | A01K 63/06 |
| 2018/0103614 A1 * | 4/2018 | Tsai | H04N 5/76 |

FOREIGN PATENT DOCUMENTS

| | | | | |
|---|---|---|---|---|
| WO | WO-9105465 A1 * | 5/1991 | | A01K 63/006 |
| WO | WO-2015104520 A1 * | 7/2015 | | G09G 3/30 |

* cited by examiner

AQUARIUM FAÇADE ASSEMBLY WITH ENCASED FAUX HUMAN HEAD

FIELD OF THE INVENTION

The present invention relates generally to an aquarium façade assembly and, more particularly, relates to an aquarium having a front facade with an encased faux human head chamber.

BACKGROUND OF THE INVENTION

Typically, aquariums are designed in numerous sizes and shapes and with various features. Many aquariums are simple, small enclosures which can be placed on tables or stands, others are quite substantial in size and are more permanent in mounting. However, most aquariums have filters, an air supply system, pumps and other devices for use in maintaining the aquarium in a condition suitable for the fish, etc.

In many instances, an eclectic variety of aquarium designs and decor are available for use in enhancing the ornamental aspects and visual effects of an aquarium. The aquarium decor is used to conceal aquarium accessories such as circulating conduits, aeration conduits, filter assemblies, heaters, or other accessories. These accessories are generally associated with maintaining a healthy environment for aquatic life within the aquarium. Furthermore, these types of accessories are important to maintaining proper temperature regulation, water circulation, and water filtration.

Often, the owners of aquariums attempt to enhance the esthetic appearance of the aquarium by decorating the aquarium with underwater figures to simulate various underwater scenes. Various aquatic plants and animals are also added to the aquarium. These efforts include placing objects constructed in the form of statuary and plant life into the aquarium tank and as such were incapable of any illumination. Most, if not all, of known aquariums also make it difficult and/or impracticable to house or employ the use of synthetic materials to generate a desired décor or effect.

Therefore, a need exists to overcome the problems with the prior art as discussed above.

SUMMARY OF THE INVENTION

The invention provides an aquarium façade assembly with encased faux human head that overcomes the hereinaforementioned disadvantages of the heretofore-known devices and methods of this general type and that creates an animated visual effect through use of a transparent or translucent sidewalls; a base with a mirror finish; LEDs shining on the mirror finish; a front façade chamber containing an aerated, bubbling liquid; and a suspended, yet moving faux human head. An aerator, an air tube, and a liquid fill-drain aperture enhance aeration, circulation, and drainage for the liquid contained in the front façade chamber, so as to enhance the visual effect of the faux human head.

A passive infrared sensor detects motion near the front sidewall and actuates motion of the faux human head through a cable, pulley, and shaft mechanism. Magnets in the base and/or cover of the aquarium assembly generate a magnetic field throughout the aquarium cavity. The magnetic field causes metallic materials integrated in the faux human head to gyrate, causing the head to gyrate accordingly. The aquarium assembly may also utilize other, similar, electrical, faux human body parts, and aquarium-related structures and aquatic life to achieve a similar visual effect. The cumulative effect creates an animated, visually stimulating aquarium.

With the foregoing and other objects in view, there is provided, in accordance with the invention, an aquarium façade assembly with encased faux human head. The aquarium assembly comprises a base that defines a bottom internal surface. The base has a left side, a right side, and a longitudinal length separating the left and right sides of the base. The base also has a plate-like panel coupled thereto. The plate-like panel spans the longitudinal length of the base. In one non-limiting embodiment, the base has a rectangular shape.

In some embodiments, the aquarium façade assembly may include a left sidewall, a right sidewall, a rear sidewall, and a front sidewall coupled to one another. The sidewalls may be transparent, or translucent in some embodiments. The base, the left sidewall, the right sidewall, the rear sidewall, the front sidewalls, and the bottom internal surface define an aquarium cavity enclosed by the sidewalls.

In some embodiments, the sidewalls comprise a two-ply layer. The two-ply layer may include a rigid, transparent material that is conducive to retaining a liquid. The two-ply layer encapsulates a front facade chamber that is parallel with the front sidewall. The front facade chamber houses a liquid, and in some embodiments, aquatic plants and animals. The front facade chamber forms at least one air tube aperture through which passes an air tube. The air tube is fluidly coupled to the front facade chamber. Further, the aquarium assembly provides an aerator that is fluidly coupled to the front facade chamber through the air tube. The aerator introduces air to the liquid in the front facade chamber. The aquarium assembly further comprises a cover that selectively and removably couples to a sidewall upper surface of the left, right, rear, and front sidewalls.

In accordance with a further feature of the present invention, the bottom internal surface of the base is defined by a mirror finish.

In accordance with a further feature of the present invention, the two-ply layer further comprises a lower surface coupled to the base and an opposing upper surface. The upper surface of the two-ply layer defines the at least one air tube aperture.

In accordance with a further feature of the present invention, the two-ply layer further comprises a liquid fill-drain aperture with a liquid fill tube disposed therein.

In accordance with a further feature of the present invention, the air tube comprises a proximal terminal end and a distal terminal end disposed within the liquid housed within the front facade chamber and disposed proximal to the lower surface of the two-ply layer.

In accordance with a further feature of the present invention, the distal terminal end of the air tube is within 4" of the lower surface of the two-ply layer.

In accordance with a further feature of the present invention, the lower surface of the two-ply layer has a cover tube assembly coupled thereto. The cover tube assembly includes at least one cover tube distal end operably configured to engage with the proximal terminal end of the air tube in a hermetically sealed configuration.

In accordance with a further feature of the present invention, the left and right sidewalls are of a substantially transparent or translucent material.

In accordance with a further feature of the present invention, the cover houses the aerator.

In accordance with a further feature of the present invention, the cover further comprises a series of plurality of LEDs housed therein and facing the aquarium cavity to shine light therein.

In accordance with a further feature of the present invention, the cover further comprises a cable with a cable distal end coupled to a faux human head disposed within the aquarium cavity and suspended above the bottom internal surface of the base; an electric motor operably coupled to a shaft, directly coupled to the cable at a cable-shaft coupling junction, and operably configured to rotate in a shaft rotation path, the cable defining an operable cable length spanning from the cable distal end to the cable-shaft coupling junction; and a pulley directly coupled to the cable along the operable cable length, wherein the shaft rotation path generates an up-and-down path of the faux human head through the cable.

In accordance with a further feature of the present invention, the cover further comprises a passive infrared sensor operably housed in the cover. The passive infrared sensor communicatively coupled to the electric motor. The passive infrared sensor is operably configured to detect a motion proximal to the front sidewall. In this manner, the detection of motion transmits an electric signal to the electric motor to place the shaft in the shaft rotation path.

In accordance with a further feature of the present invention, the aquarium assembly further comprises a lower magnet at the base and an upper magnet at the base of the faux head. The lower and upper magnet generating a magnetic field through the aquarium cavity. In one non-limiting embodiment, the lower magnet is larger than the upper magnet.

In accordance with a further feature of the present invention, the aquarium assembly further comprises a metallic material that is disposed in the faux human head. The metallic material gyrates in response to the generated magnetic field, which consequently causes the faux human head to gyrate.

One objective of the present invention is to provide an aquarium with an animated façade of a faux human head that is illuminated by LEDs and extenuated with a front facade chamber containing aerated liquid.

Another objective is to suspend the faux human head in the empty aquarium cavity, and not in the liquid of the front facade chamber, so that the faux human head can utilize realistic materials to emulate the human head.

Another objective is to provide a two-ply layer that encapsulates a front section of the aquarium to contain the liquid.

Another objective is to create bubbles in the liquid with an aerator.

Another objective is to provide a motion sensor that actuates motion of the faux human head upon detecting presence of a person near the front sidewall.

Another objective is to provide magnets that create a magnetic field to gyrate the faux human head.

Although the invention is illustrated and described herein as embodied in an aquarium façade assembly with encased faux human head, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the aquarium from left to right sides of the structure of the aquarium, wherein "transverse" is the direction opposite of the longitudinal direction. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
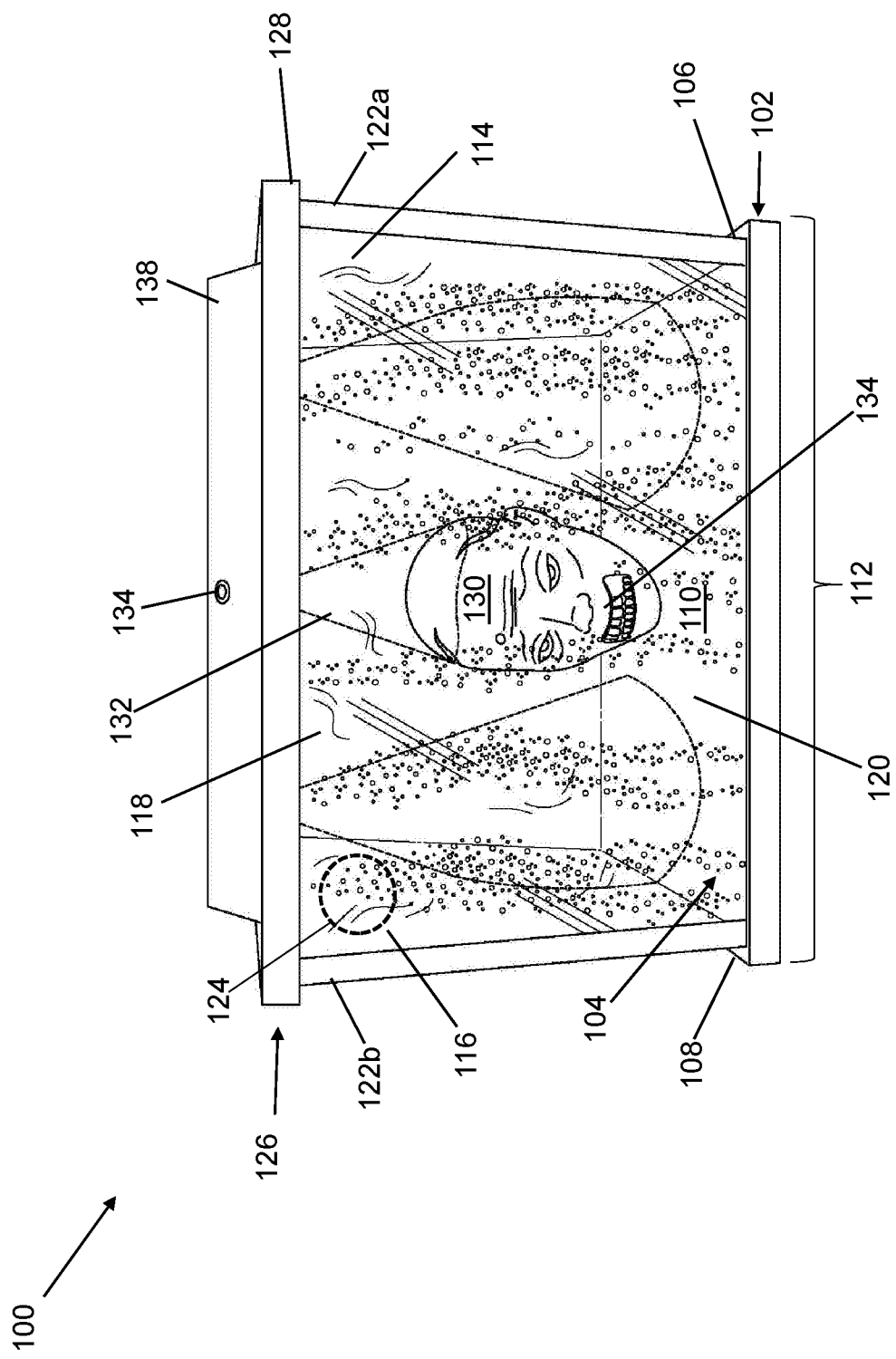
FIG. 1 is a frontal perspective view of an exemplary aquarium façade assembly with encased faux human head, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient aquarium façade assembly 100 with encased faux human head 130. Embodiments of the invention provide an aquarium having transparent sidewalls 114, 116, 118, 120, a base 102 that may have a mirror finish 110 on an internal surface thereon, and a front facade chamber 900 that contains an aerated liquid 124. In addition, embodiments of the invention provide series of plurality of LEDs 1502 that illuminate to reflect light off the mirror finish 110. The aquarium assembly 100 also provides a faux human head 130 suspended from the cover 126, and visible behind the front facade chamber 900.

The aquarium assembly 100 also provides a passive infrared sensor 134 that detects motion at the front sidewall 120 to actuate motion of the faux human head 130. The aquarium assembly 100 also provides upper (disposed in the faux head 130 or cover 126) and lower magnets 2000a-c that generate a magnetic field throughout the aquarium cavity 202, causing metallic material 136 in the faux human head 130 to create a gyrating motion therein. The cumulative effect of aerated liquid 124, reflected lighting, and moving faux human head 130 creates an animated, visually stimulating aquarium environment.

It should be understood that terms such as, "front," "rear," "side," "top," "bottom," and the like are indicated from the reference point of a viewer viewing the aquarium, and its base 102, cover 126, sidewalls 114, 116, 118, 120, and front façade chamber 900. As used herein, the term "sidewall" is intended broadly to encompass continuous structures, as well as, separate structures that are coupled together so as to form a substantially continuous external surface for an aquarium.

Referring now to FIG. 1, one embodiment of the present invention is shown in a perspective frontal view. FIG. 1 shows several advantageous features of the present invention, but, as will be described below, the invention can be provided in several shapes, sizes, combinations of features and components, and varying numbers and functions of the components. The first example of an aquarium façade assembly 100 with one or more encased faux human head(s) 130, as shown in FIG. 1, includes a base 102 upon which the sidewalls 114, 116, 118, 120 and cover 126 are supported.

Figure 2:
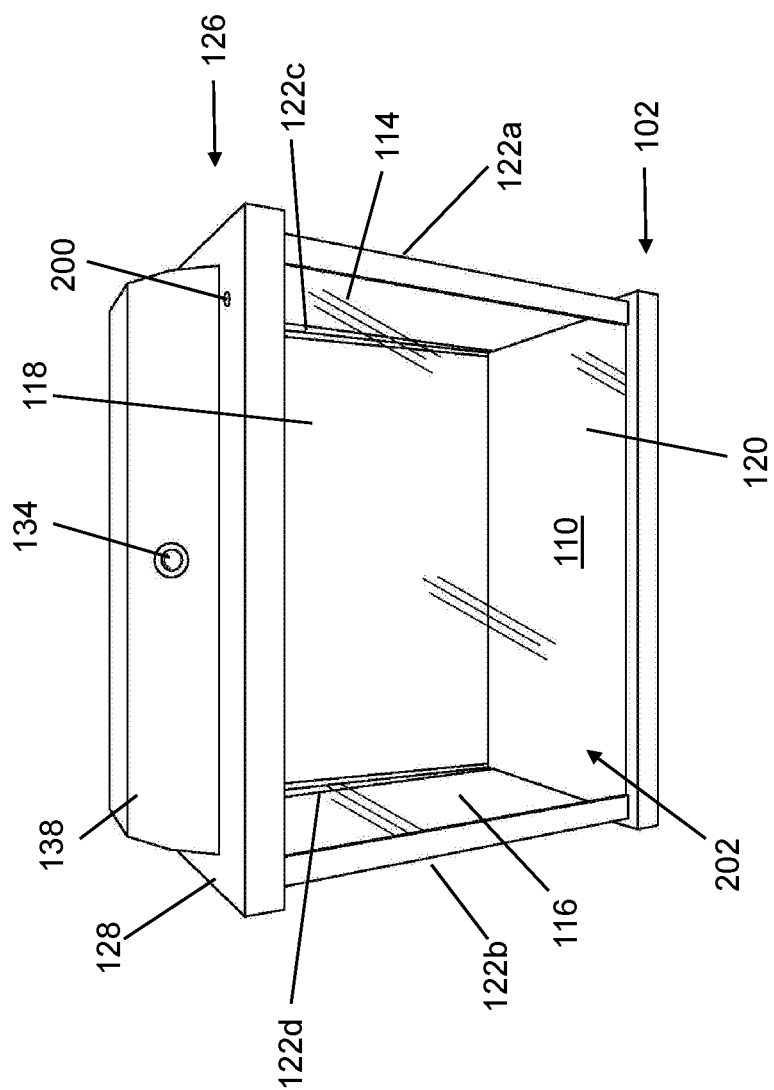
FIG. 2 is a frontal perspective view of the aquarium façade assembly, showing the base, the sidewalls, the cover, and the passive infrared sensor, in accordance with the present invention.

As FIG. 2 references, the base 102 defines a bottom internal surface 104. Further, the base 102 has a left side 106, a right side 108, and a longitudinal length 112 separating the left and right sides 106, 108 of the base 102. In one non-limiting embodiment, the base 102 has a rectangular shape. Though in other embodiments, the base 102 can have a square shape, a spherical shape, a triangular shape, and an irregular shape. With any of these aquarium shapes, the façade effect, LEDs, mirror finish 110 surfaces, and moving faux human head 130 may be utilized as further discussed herein.

With brief reference to FIGS. 1-2 and 6-7, the base 102 provides a plate-like panel 700 coupled thereto. The plate-like panel 700 spans the longitudinal length 112 of the base 102. In one embodiment, the plate-like panel 700 comprises a back-panel guide 602 extending longitudinally across the plate-like panel 700. The back-panel guide 602 helps align the plate-like panel 700 to the base 102. In other embodiments, multiple aluminum panel supports and/or receiving portions on the base 604a, 604b, 604c are arranged in parallel series to provide structural integrity to the plate-like panel 700.

In one non-limiting embodiment, the bottom internal surface 104 of the base 102 is defined by a mirror finish 110 that creates reflection throughout the aquarium cavity 202 and against the sidewalls. The mirror finish 110 allows lights that shine on the base 102 to reflect and create an ornamental, animated effect in the aquarium cavity 202 and other components therein, i.e., faux human head 130.

Figure 3:
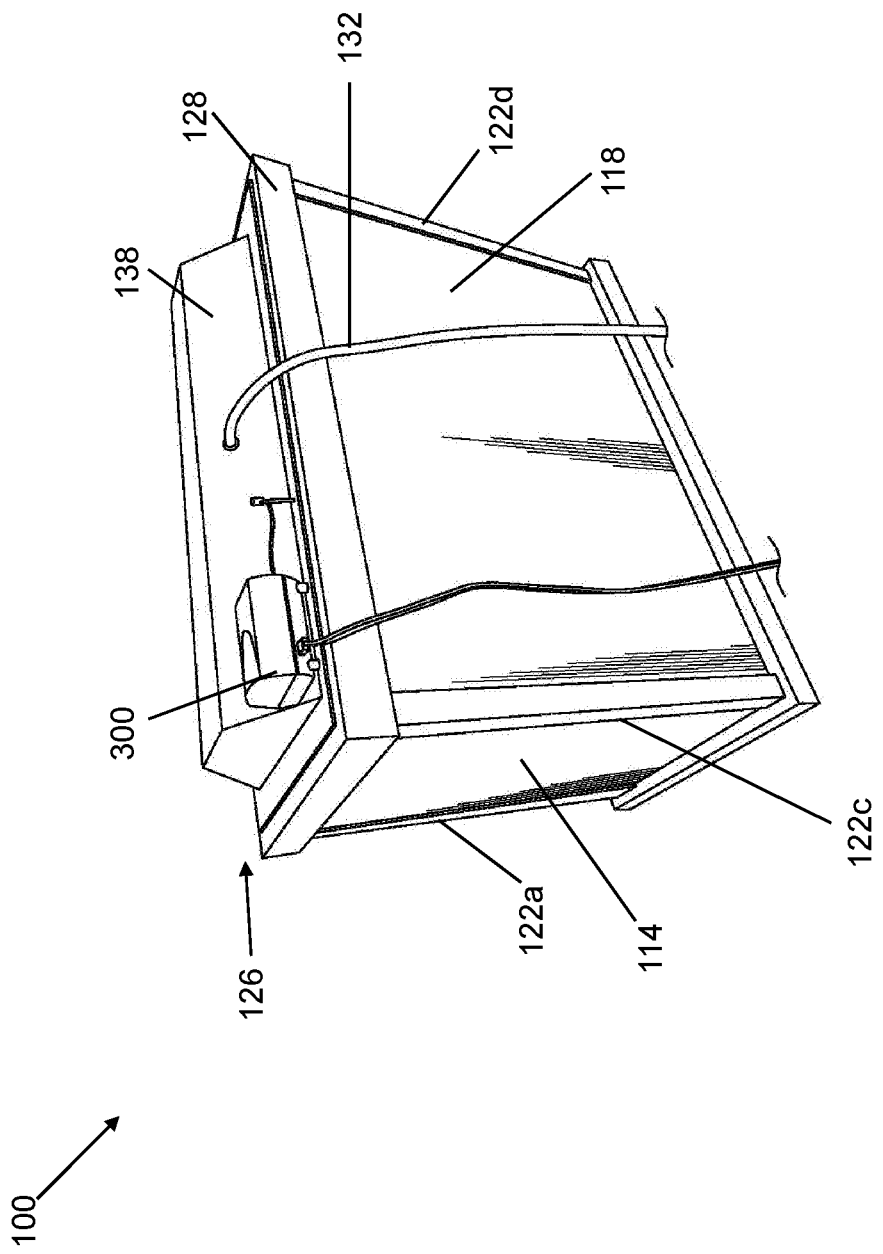
FIG. 3 is a rear perspective view of the aquarium façade assembly, showing the aerator, in accordance with the present invention.
Figure 4:
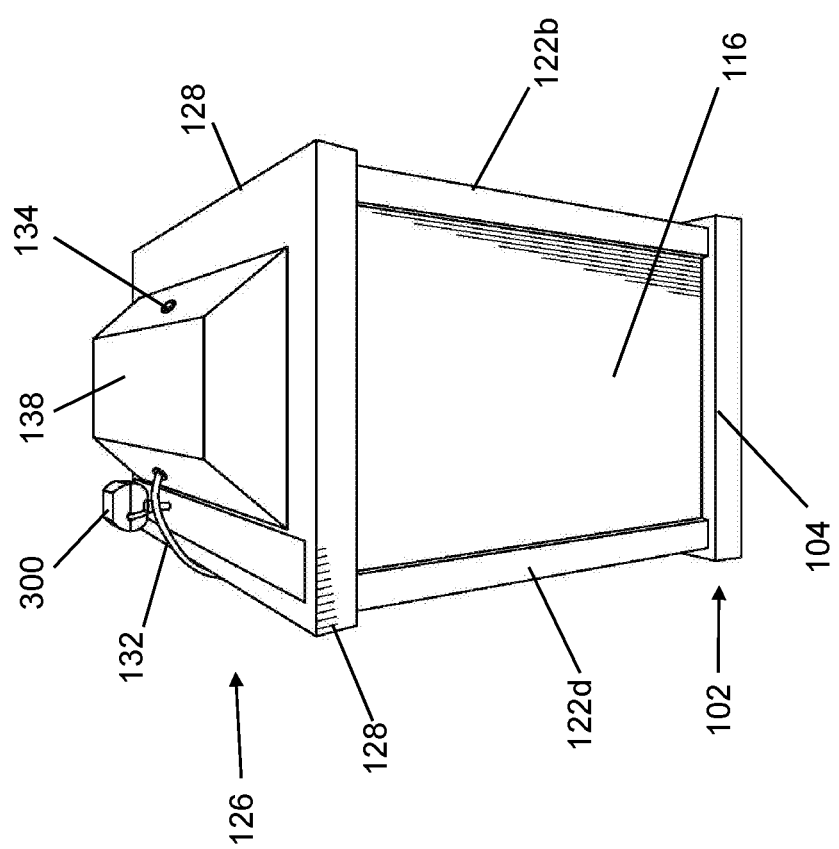
FIG. 4 is a right-side perspective view of the aquarium façade assembly, in accordance with the present invention.
Figure 8:
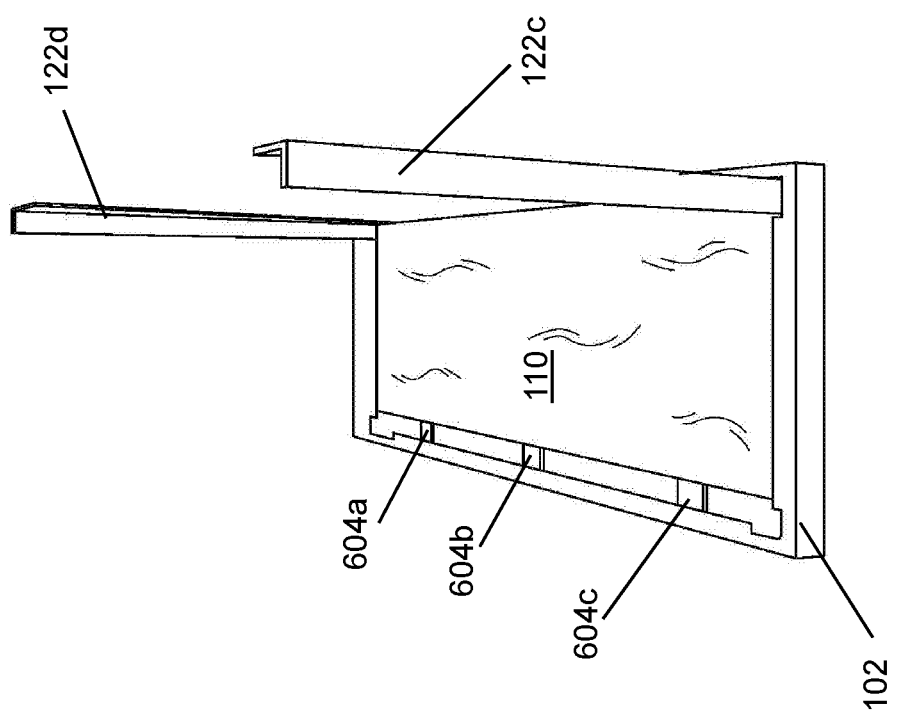
FIG. 8 is a perspective view of the base having a mirror finish, and a pair of corner brackets, in accordance with the present invention.

Turning now to FIGS. 3 and 8, the aquarium assembly 100 further comprises a left sidewall 114, a right sidewall 116, a rear sidewall 118, and a front sidewall 120 that couple to one another to create the sidewall perimeter of the aquarium and facilitate in defining the aquarium cavity 202. Additionally, multiple corner brackets 122a, 122b, 122c, 122d are vertically disposed between the edges of the sidewalls to create structural integrity. A silicone sealant may be used at the junction to prevent leakage. In some embodiments, the sidewalls may join at their edges to form an orthogonal relationship that defines a rectangular-shaped aquarium. The sidewalls 114, 116, 118, 120 may be transparent so as to enable viewing inside an aquarium cavity 202 that forms in the sidewalls 114, 116, 118, 120. However, in other embodiments, the sidewalls 114, 116, 118, 120 are translucent. Unless specifically identified, the term "transparent" shall be defined to include translucency.

Figure 5:
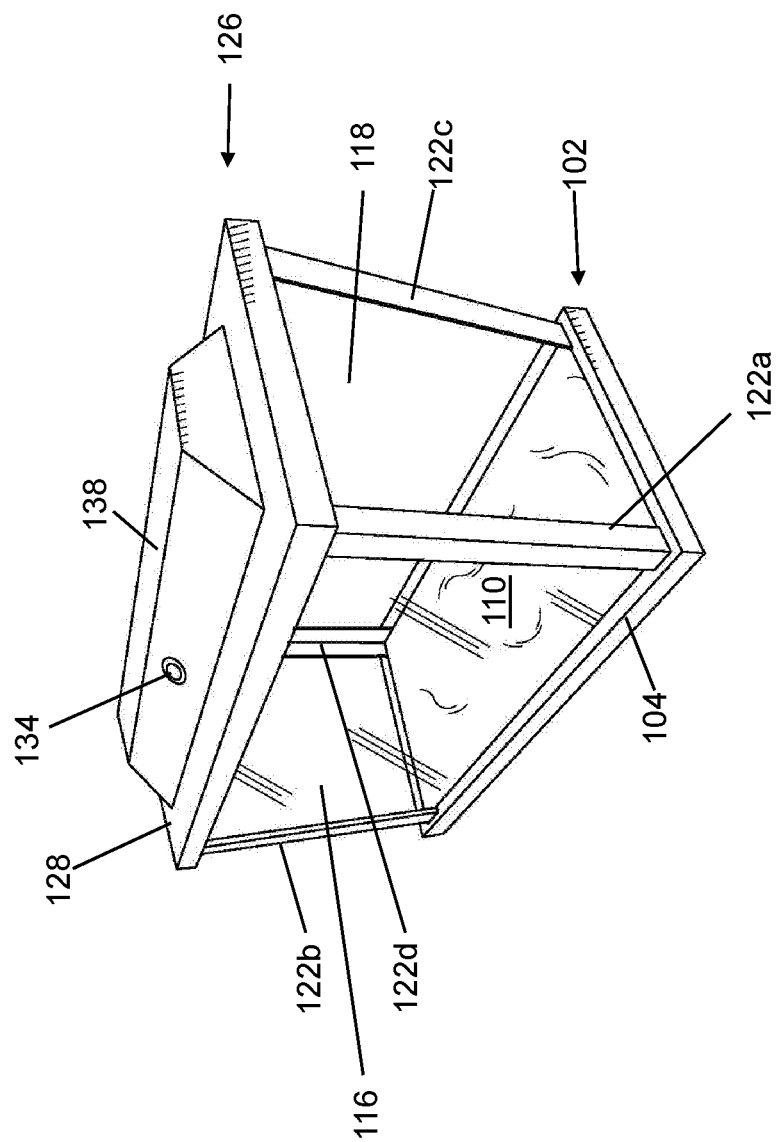
FIG. 5 is an angled perspective view of the aquarium façade assembly, in accordance with the present invention.
Figure 6:
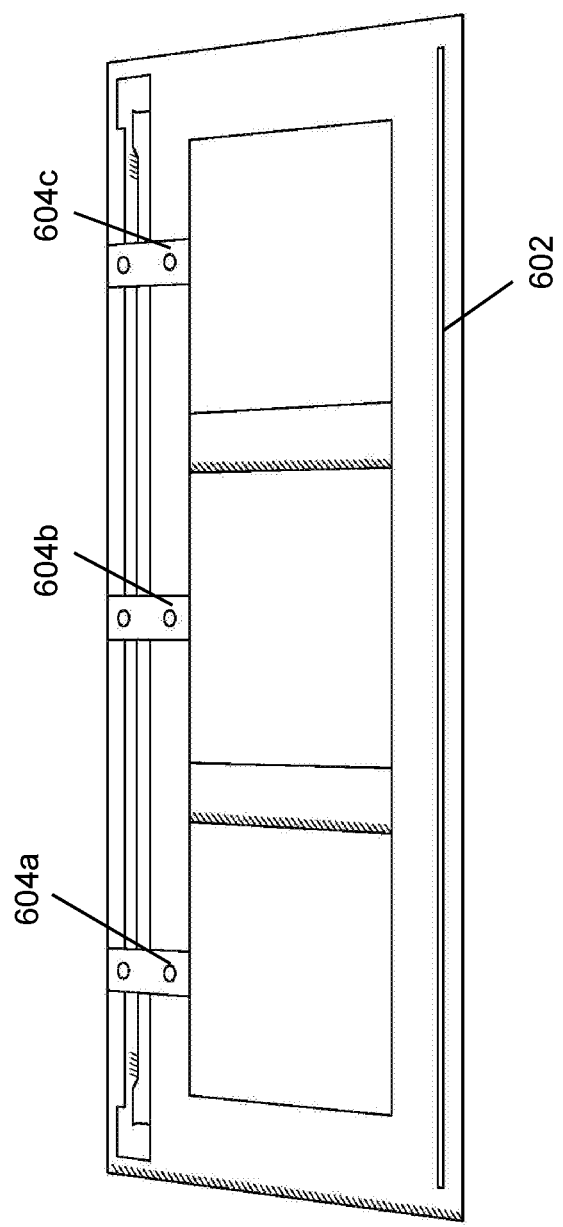
FIG. 6 is a top view of an exemplary base, in accordance with the present invention.
Figure 7:
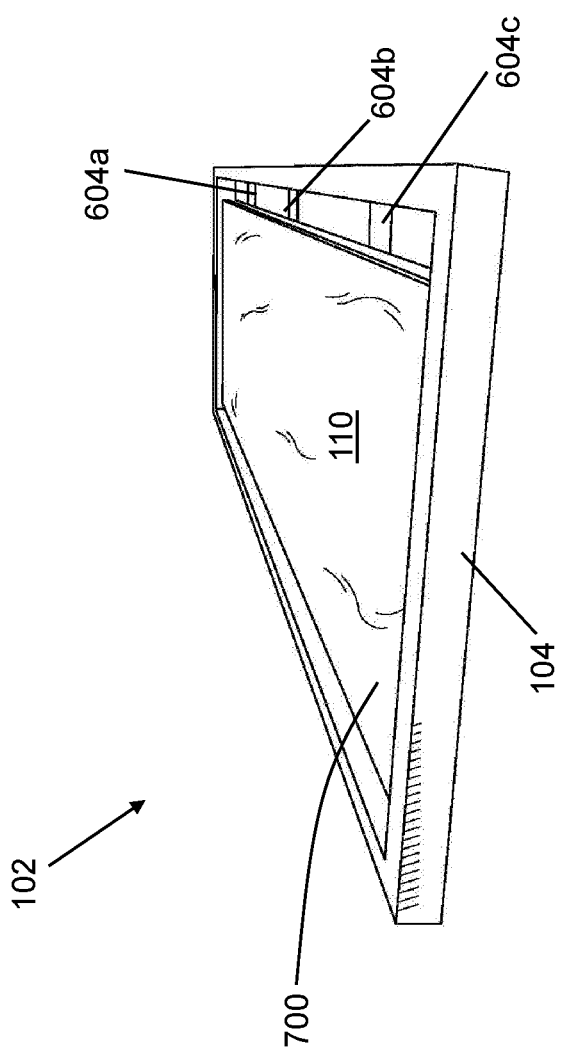
FIG. 7 is a perspective view of the base with a plate having a mirror finish, in accordance with the present invention.

In yet another embodiment shown in FIG. 5, the one or more sidewall(s) 114, 116, 118, 120 may be colored to create an illusion. The base 102, the left sidewall 114, the right sidewall 116, the rear sidewall 118, the front sidewall 120, and the bottom internal surface 104 define an aquarium cavity 202 enclosed by the sidewalls 114, 116, 118, 120. Suitable materials for the sidewalls 114, 116, 118, 120 may include, without limitation, glass, acrylic, low-iron glass, and a transparent polymer.

Figure 9:
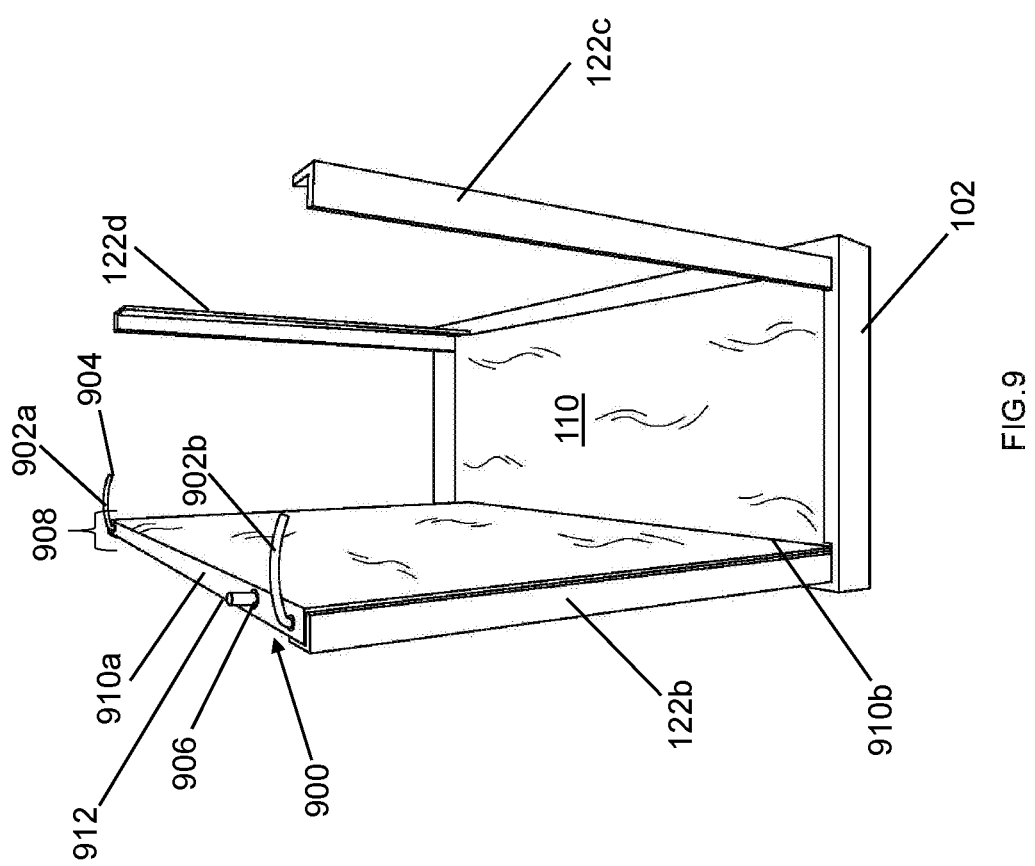
FIG. 9 is a perspective view of the base with brackets and a front façade chamber coupled thereto, in accordance with the present invention.

Looking ahead to FIG. 9, the aquarium assembly 100 includes a two-ply layer 908 defining the front sidewall 120. The two-ply layer 908 may include two or more rigid, transparent, flat panels that are conducive to retaining a liquid 124 without leaking. A bond, or silicone sealant may be used at the edges of the two-ply layer 908 and the sidewall junctions to prevent leakage.

The two-ply layer 908 further comprises a lower surface 910b that couples to the base 102. The two-ply-layer 908 also has an opposing upper surface 910a defined by at least one air tube aperture 200. In some embodiments, the two-ply layer 908 further comprises a liquid fill-drain aperture 906 with a liquid fill tube 912 disposed therein. The liquid fill tube 912 allows excess liquid 124 to be drained to an external reservoir or drain. This may be useful for cleaning the front facade chamber for example.

The two-ply layer 908 encapsulates a front facade chamber 900 that may be parallel with the front sidewall 120 orientation. The front facade chamber 900 houses a liquid, and in some embodiments, aquatic plants and animals. The upper surface 910a of the two-ply layer 908 and the front facade chamber 900 form at least one air tube aperture 200 through which passes to one or more air tube(s) 902a-b. The air tube(s) 902a-b are fluidly coupled to the front facade chamber 900 for purposes of releasing excess gasses from the liquid, ingression of fresh oxygen or other gas(es) into the liquid, and/or creating a circulatory effect in the front façade chamber 900. In one embodiment, the front facade chamber 900 may be approximately 0.5-3 inches thick and span the height or width of the front sidewall 120. In other embodiments, the thickness of the front facade chamber 900 may vary outside of said range.

Figure 10:
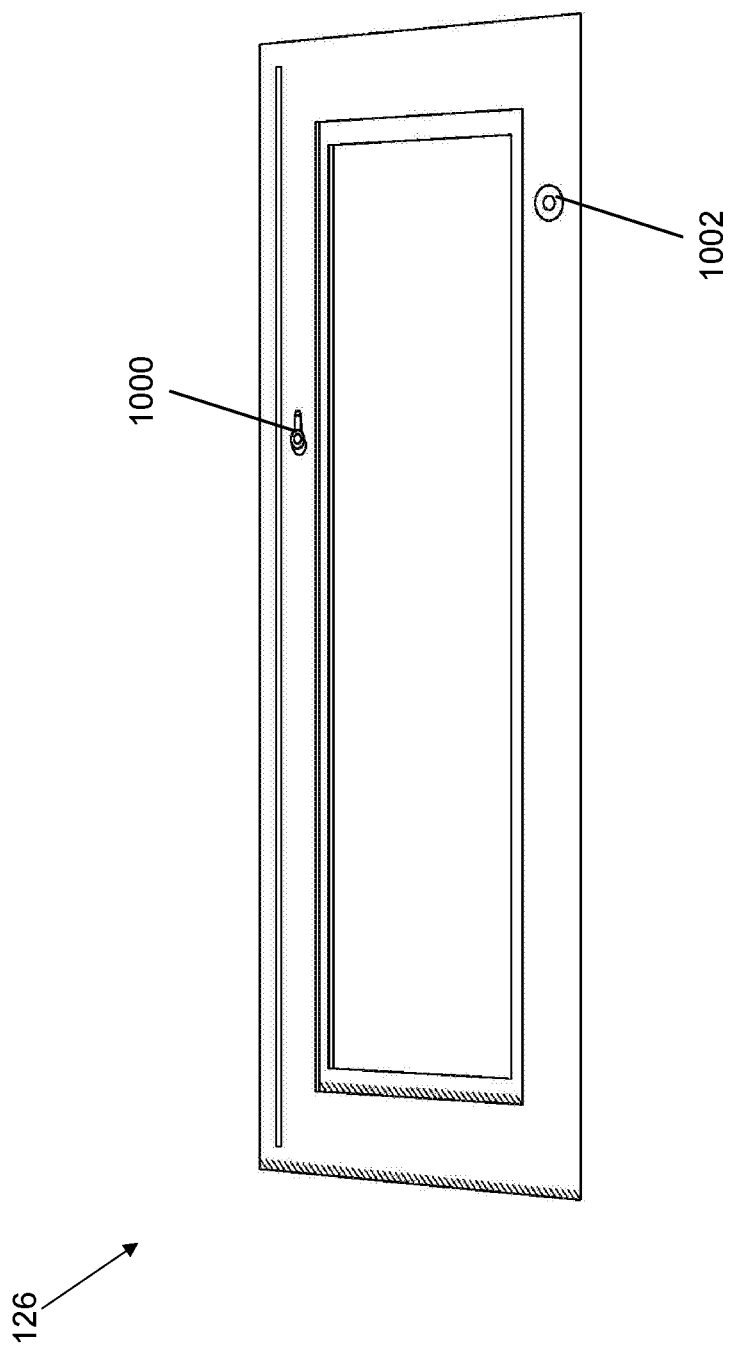
FIG. 10 is a top view of the upper surface of the cover, in accordance with the present invention.
Figure 11:
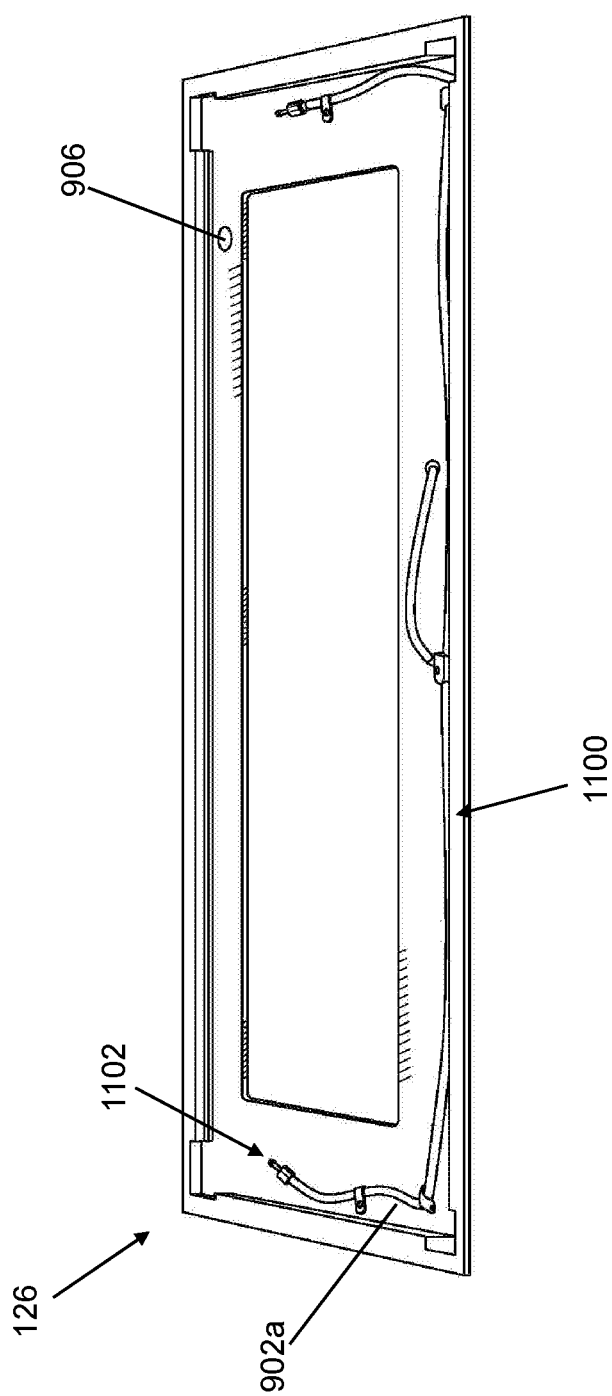
FIG. 11 is a top view of the lower surface of the cover, in accordance with the present invention.
Figure 12:
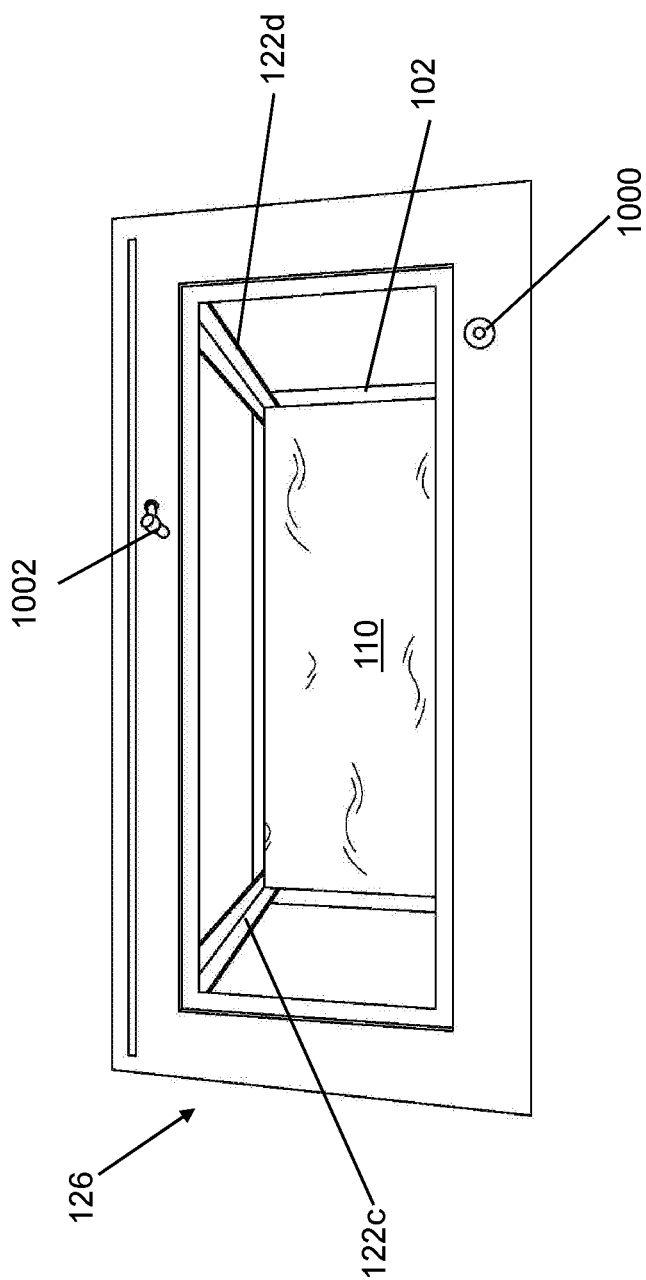
FIG. 12 is a top view of the aquarium with the cover removed, in accordance with the present invention.
Figure 13:
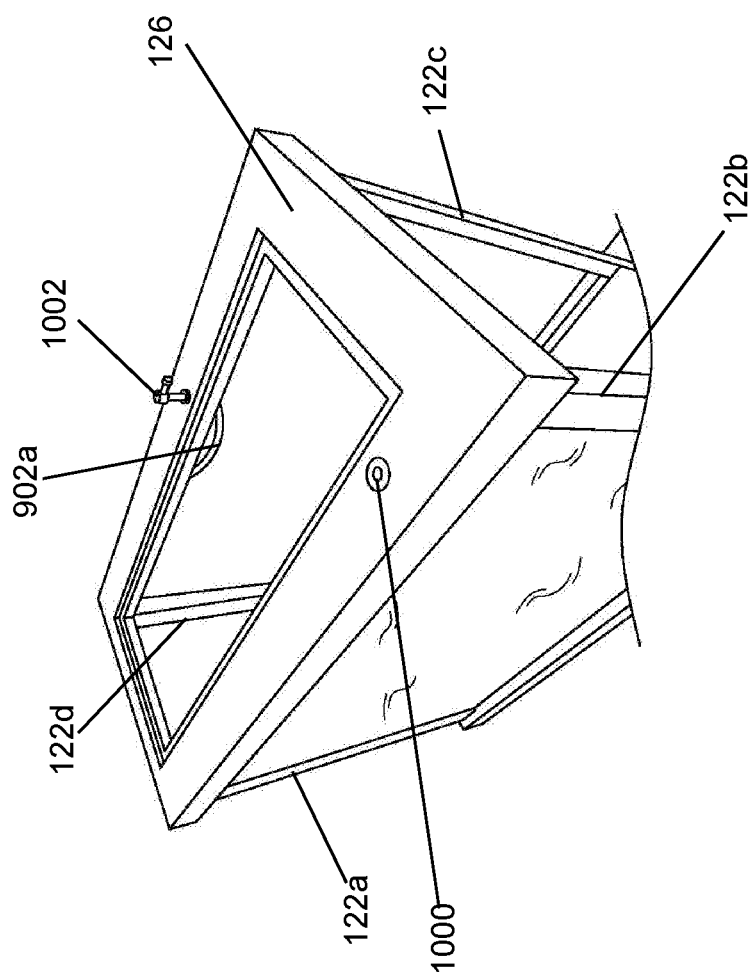
FIG. 13 is a top view of the aquarium with the LED housing removed, in accordance with the present invention.
Figure 14:
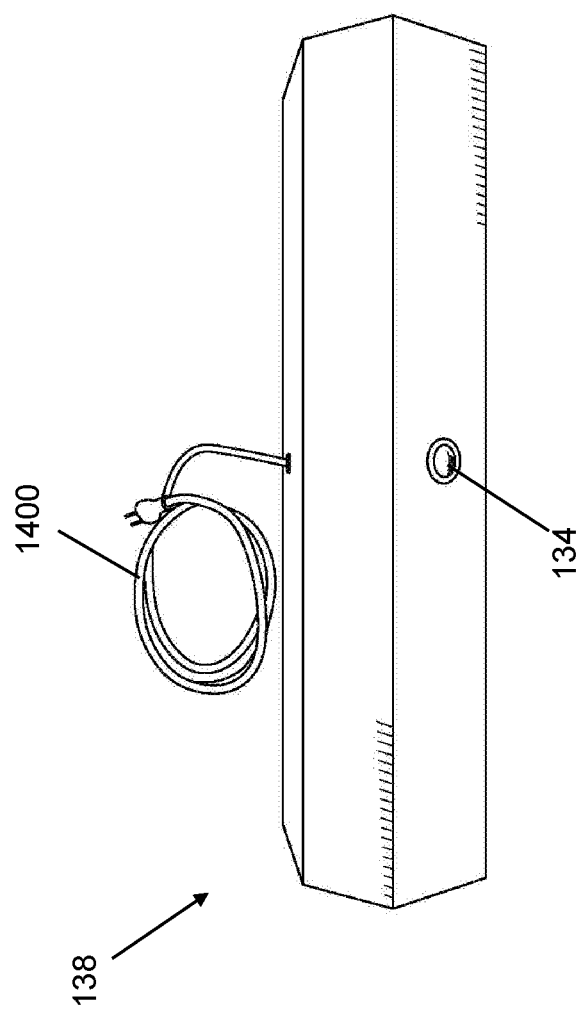
FIG. 14 is a perspective view of the LED housing and power cord, in accordance with the present invention.
Figure 15:
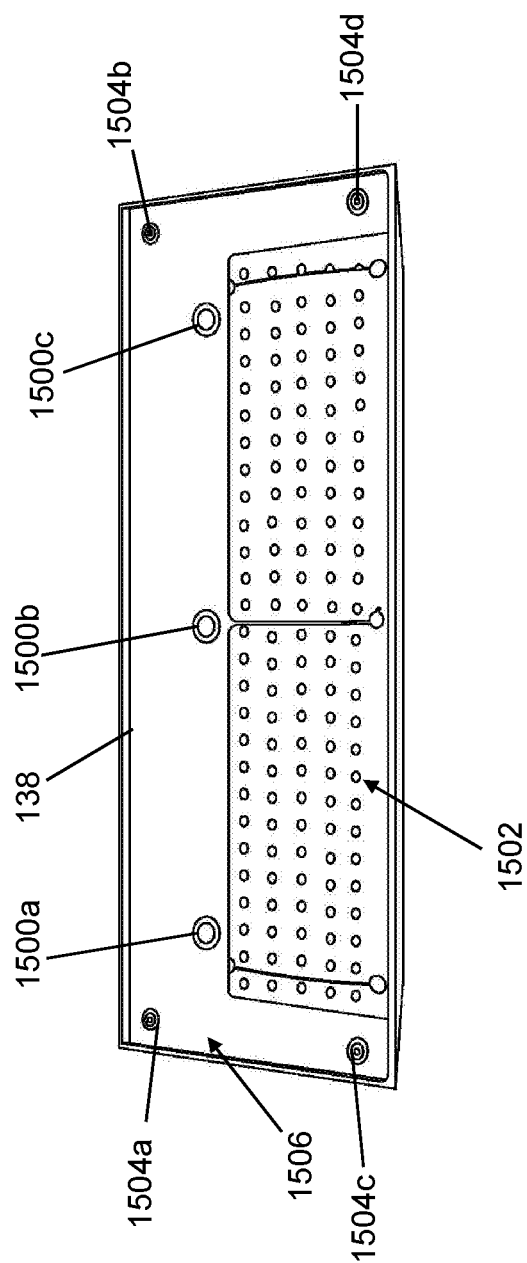
FIG. 15 is a top view of the series of LEDs operational in the LED housing, in accordance with the present invention.
Figure 16:
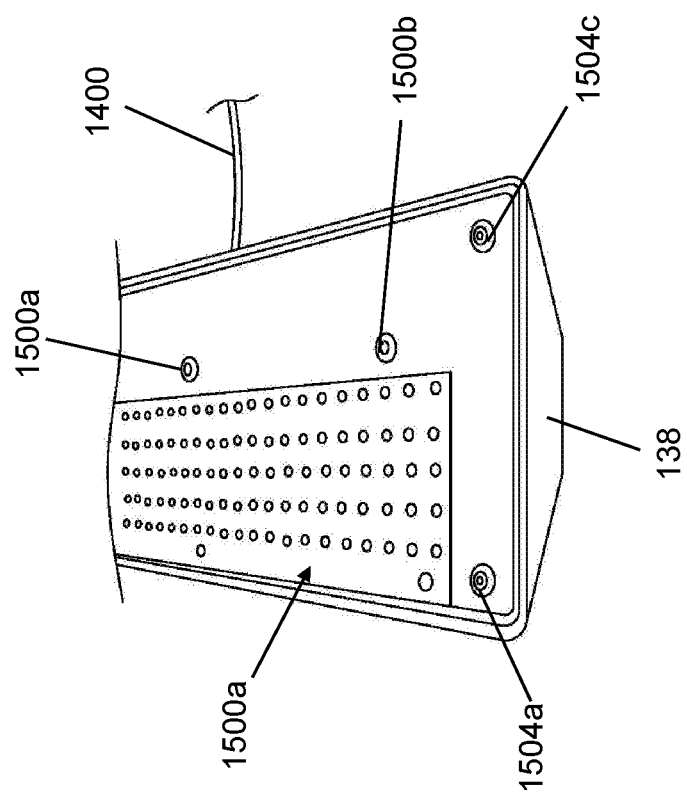
FIG. 16 is a side perspective view of the series of LEDs operational in the LED housing, in accordance with the present invention.

Turning now to FIGS. 9-11, the air tube(s) 902a-b include a proximal terminal end 904 and a distal terminal end disposed within the liquid. Said another way, a portion of the air tube(s) 902a-b is housed inside the front facade chamber 900. In one embodiment, the distal terminal ends of the air tube(s) 902a-b may be disposed proximal to the lower surface 910b of the two-ply layer 908, e.g., at or within approximately 4-6 inches of the lower surface 910b. In one non-limiting embodiment, the distal terminal end of the air tube is within 4" of the lower surface 910b of the two-ply layer 908. The air tube(s) 902a-b may include a flexible plastic tube that can be bent, i.e., it is flexible, to carry air and/or water to and from the front façade chamber 900.

The upper surface 910a of the two-ply layer 908 has a cover tube assembly 1100 that is coupled thereto. The cover tube assembly 1100 is coupled to the cover 126 and includes at least one cover tube distal end 1100 that is operably configured to engage with the proximal terminal end 904 of the air tube(s) 902a-b in a hermetically sealed configuration. This connection may be a snug friction fit connection, or a sealed connection. FIG. 10 shows a top view of the cover 126 with a cover tube proximal end 1000, which may include a valve (also referred to as an aerator valve), extending through the cover 126. The cover 126 may also define an aperture 1002 for an air line or drain tube.

As seen in FIGS. 1, 4, 11, and 14, the aquarium assembly 100 provides an aerator 300 that is fluidly coupled to the front facade chamber 900 through the cover tube assembly 1100 and the air tube(s) 902a-b. The aerator 300 introduces air to the liquid in the front facade chamber 900. By introducing air into the front façade chamber 900, the front façade chamber 900 creates an illusion of bubbles in the aquarium cavity 202 behind the front façade chamber 900 to enhance the visual effect of the faux human head 130, i.e., give the appearance the human head 130 is submerged within the fluid, although it is not so as to preserve the integrity of the head 130. The aerator 300 may be powered by an internal battery, or an external power source, e.g., a 120V AC outlet, through an electric cord 1400. In one embodiment, the cover 126 includes an aerator adjuster valve to adjust the flow of the air or other gas mixed into the liquid by the aerator 300.

The front facade chamber 900 is therefore configured to display a bubbling, agitated liquid that gives it the appearance of circulating through the entirety of the aquarium cavity 202. However, since the liquid is contained only inside the front facade chamber 900, and not the entirety of the aquarium cavity 202, the other components of the assembly 100, including the faux human head 130, remain dry. This allows the faux human head 130 to use realistic materials that would ordinarily degrade when subjected or submerged into a liquid.

As seen in FIGS. 1, 4, 10-11, and 14-15, the cover 126 of the aquarium assembly 100 is selectively and removably coupled to a sidewall upper surface of the left, right, rear, and front sidewalls 114, 116, 118, 120. The cover 126 may be of a relatively flat panel having a small reservoir for housing electrical components, including the aerator 300, a series of plurality of LEDs 1502, and wires/circuits therefore. The cover 126 may form a friction fit or snap-on connection. However, in other embodiments, the cover 126 fastens to the sidewall upper surface using other fasteners. The cover 126 serves to house various components, hang the faux human head 130, and prevent debris from entering the aquarium cavity 202.

The cover 126 further comprises a series of plurality of LEDs 1502 housed therein. The LEDs 1502 are oriented to face the aquarium cavity 202 to shine light therein. This allows the light to strike the mirror finish 110 at the bottom internal surface 104 of the base 102, creating reflections and light illusions throughout the aquarium cavity 202. In some embodiments, the LEDs 1502 may be colored lights, flashing lights, and patterned lights.

The LEDs 1502 may cover 126 the entirety of a lower surface 1506 surface of the cover 126 or may be disposed at specific points on the cover 126 to create a desired lighting illusion. In some embodiments, a separable LED housing 138 may be positioned over the cover 126, wherein the cover 126 may include a recessed flange 1004 sized to receive the outer perimeter edge of the LED housing 138. In one embodiment, multiple fastening holes 1504a-d enable passage of screws, bolts, or other fasteners to secure the LED housing 138 to the cover 126. The LED housing 138 is configured to house the LEDs 1502, and protect electrical components thereof.

With reference now to FIGS. 14-16 and 19, a plexiglass cover 1900 is disposed between the cover 126 and the LED housing to reduce heating from the LEDs 1502. The power cord 1400 may plug into an external power source for powering the LEDs 1502 and other electrical components of the aquarium assembly 100. However, in alternative embodiments, the LEDs 1502 may have an internal battery 1800, or solar panel. The plexiglass cover or plate 1900 also beneficially facilitates to encapsulate the LEDs 1502 within the cover 126. As such, the plexiglass cover 1900 is transparent. The plexiglass cover or plate 1900 also defines one or more cable aperture(s) 1500a-n shaped and sized to receive a portion of the cable 132 that holds the faux or prop head 130. Said another way, the cable aperture(s) 1500a-n permit the cable 132 to extend and move therethrough. To this end, each of the cable aperture(s) 1500a-n may include a rigid eyelet or grommet that facilitates in effective movement of the cable 132 without damaging the plate 1900.

With reference to FIGS. 1-2 and 17-18, the cover 126 may include a cable 132 that has a portion configured to hang down into the aquarium cavity 202. The cable is defined by a cable distal end 1708 that is coupled to the faux human head 130 within the aquarium cavity 202. The cable 132 suspends the faux human head 130 above the bottom internal surface 104 of the base 102. In one embodiment, the faux human head 130 suspends proximal (e.g., at or within 3-6 inches) to the bottom internal surface 104 of the base. The faux human head 130 is defined by a generally spherical shape, eyes, a nose, a mouth, and ears. Though other configurations of a human, animal, plant, or ghoulish head may also be used for the faux human head 130.

The faux human head 130 may be suspended on the cable 132 with no motion, or may move and gyrate to create an enhanced visual effect behind the front façade chamber 900. The cable 132 that supports the faux human head 130 may include, without limitation, a wire, rope, or other type of resilient cable known in the art. In one embodiment, electrical wiring may run along the length of the cable 132 to provide electricity to the faux human head 130, such as for illuminating portions of the faux human head 130 or creating motion in the head.

For powering the actuation of the faux human head 130, the aquarium assembly 100 provides an electric motor 1704 with an independent battery power source 1802 or other power source, e.g., an approximate 112 VAC power source. In one embodiment, the electric motor 1704 is a 9V metal gear motor. As such, the assembly 100 may also include a driver, e.g., one or more electrical components to convert alternative current (AC) received from an outlet, operably configured to covert AC to direct current (DC). The electric motor 1704 is operably coupled to a shaft 1702. The shaft 1702 is directly coupled to the cable 132 at a cable-shaft coupling junction 1710, and is operably configured to rotate in a shaft rotation path (an exemplary path is represented by arrow 1712). The cable 132 may define an operable cable length 1706 that spans from the cable distal end 1708 to the cable-shaft coupling junction 1710.

Figure 17:
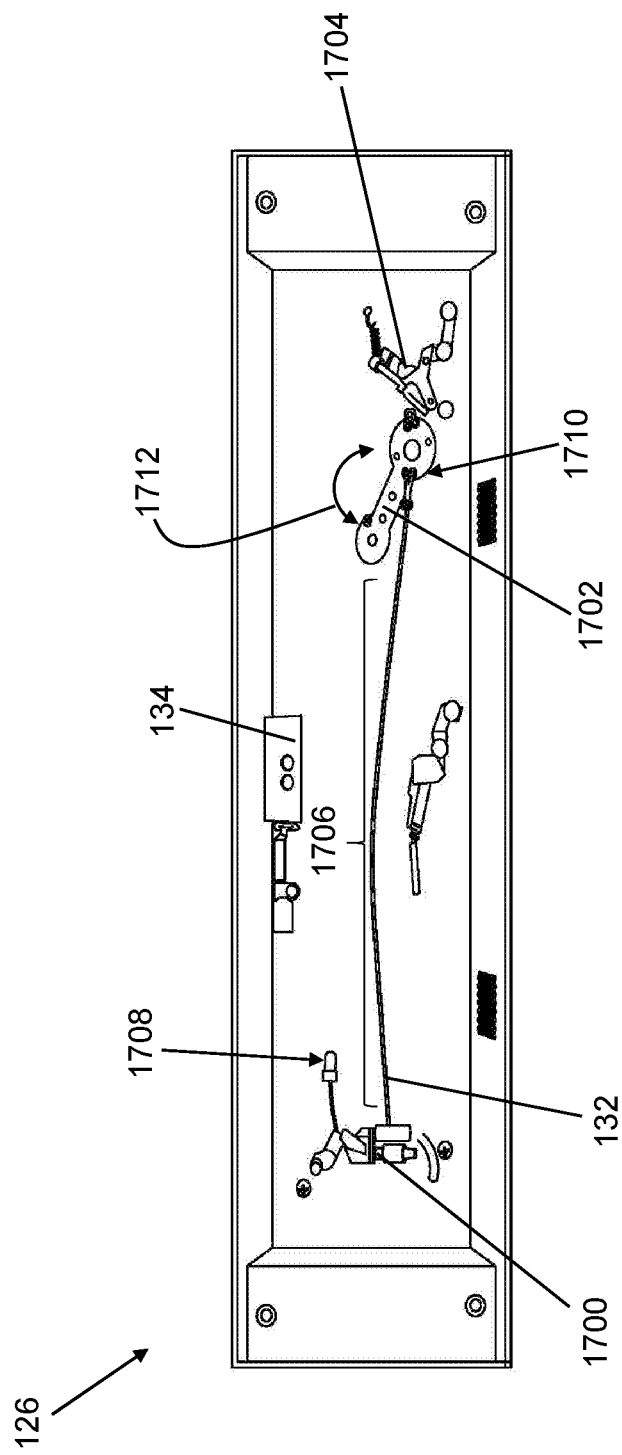
FIG. 17 is a top view of the cover to the LED housing, showing the cable, shaft, electric motor, and components for actuating the faux human head, in accordance with the present invention.
Figure 18:
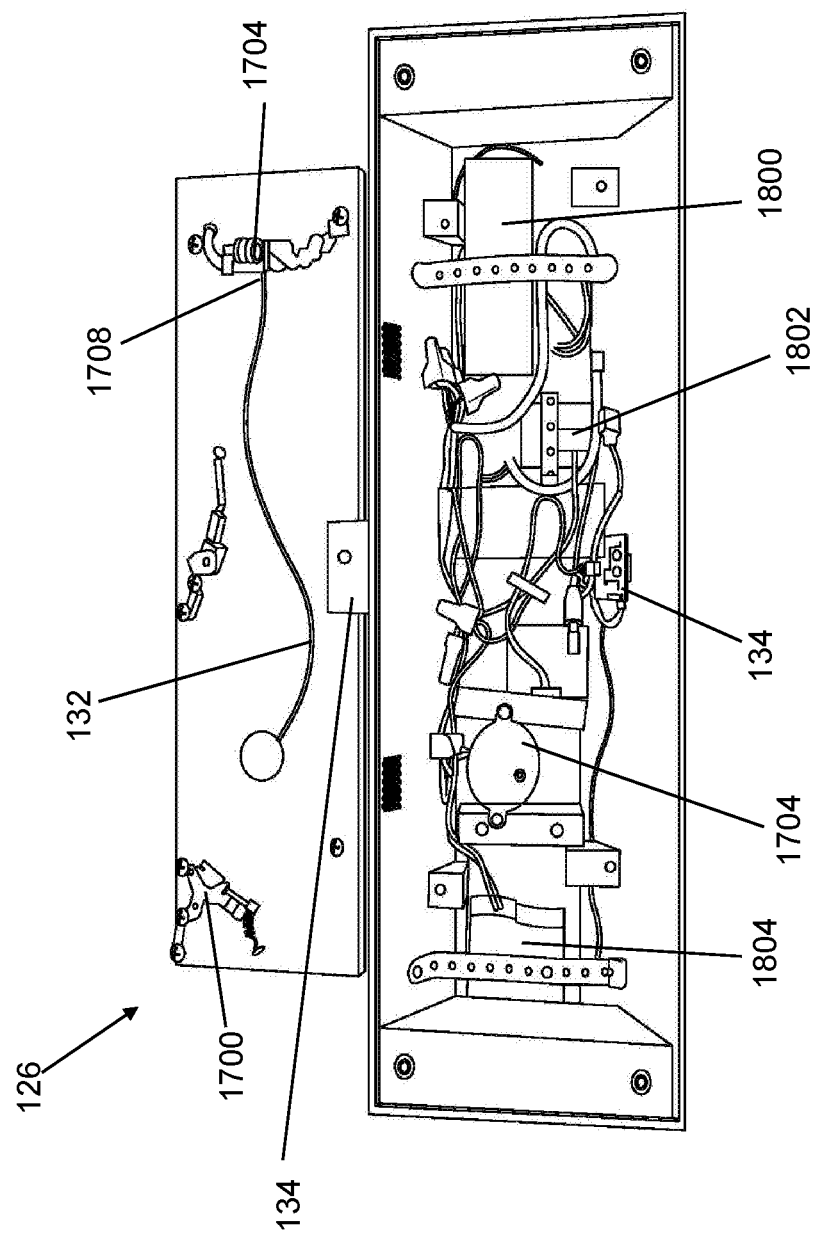
FIG. 18 is a top view of the cover to the LED housing, showing the cable, shaft, electric motor, and electrical components for actuating the faux human head, in accordance with the present invention.
Figure 19:
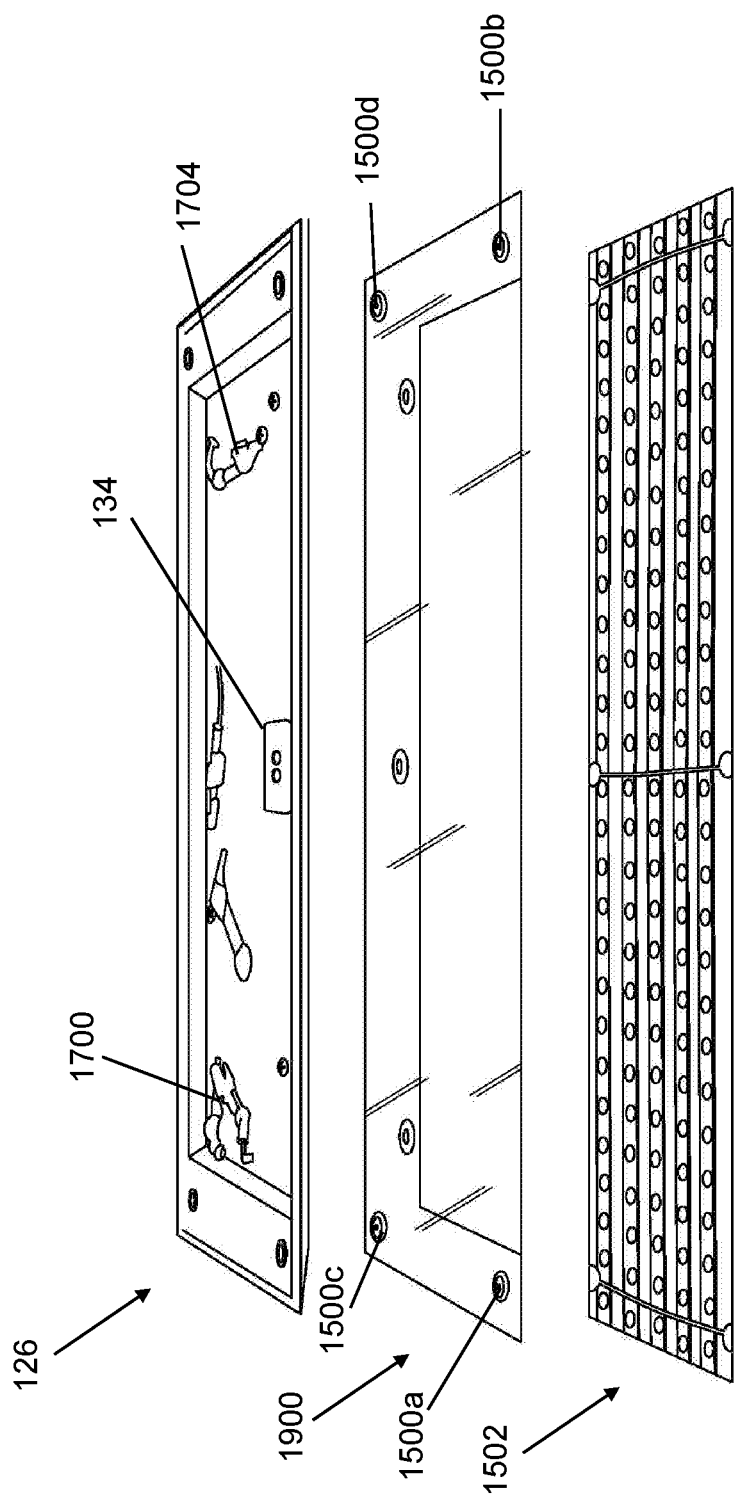
FIG. 19 is a perspective view of a plexiglass cover disposed between the LEDs and the LED housing, in accordance with the present invention.

Looking now at FIG. 19 in connection with FIGS. 17-18, the aquarium assembly 100 provides a pulley 1700 that actuates motion of the faux human head 130. The pulley 1700 is directly coupled to the cable 132 along the operable cable length 1706. In this manner, the shaft rotation path 1712, generates an up-and-down path of the faux human head 130 within the aquarium cavity 202 through the shaft 1702 and the cable 132. Said another way, the rotation of shaft 1702 by the motor 1704 is operably configured to create an up-and-down motion, or a lateral motion, or bobbing motion to the faux human head 130 while within the aquarium cavity 202. And as discussed above, the faux human head 130 is suspended in the empty aquarium cavity 202, and not in the liquid of the front façade chamber. In this manner, the faux human head 130 can utilize realistic materials to emulate the human head. In some embodiments, when the assembly utilizes two or more faux human heads 130, the rotation of shaft 1702 by the motor 1704 may include a plurality of cables 1706 respectively coupled to the two or more human heads 130 to extend and retract to create an up-and-down motion, or a lateral motion, or bobbing motion to the faux human heads 130 while within the aquarium cavity 202. In preferred embodiments, the faux heads 130 may extend and retract in an alternating fashion due to the operative length of the cable 132.

Figure 20:
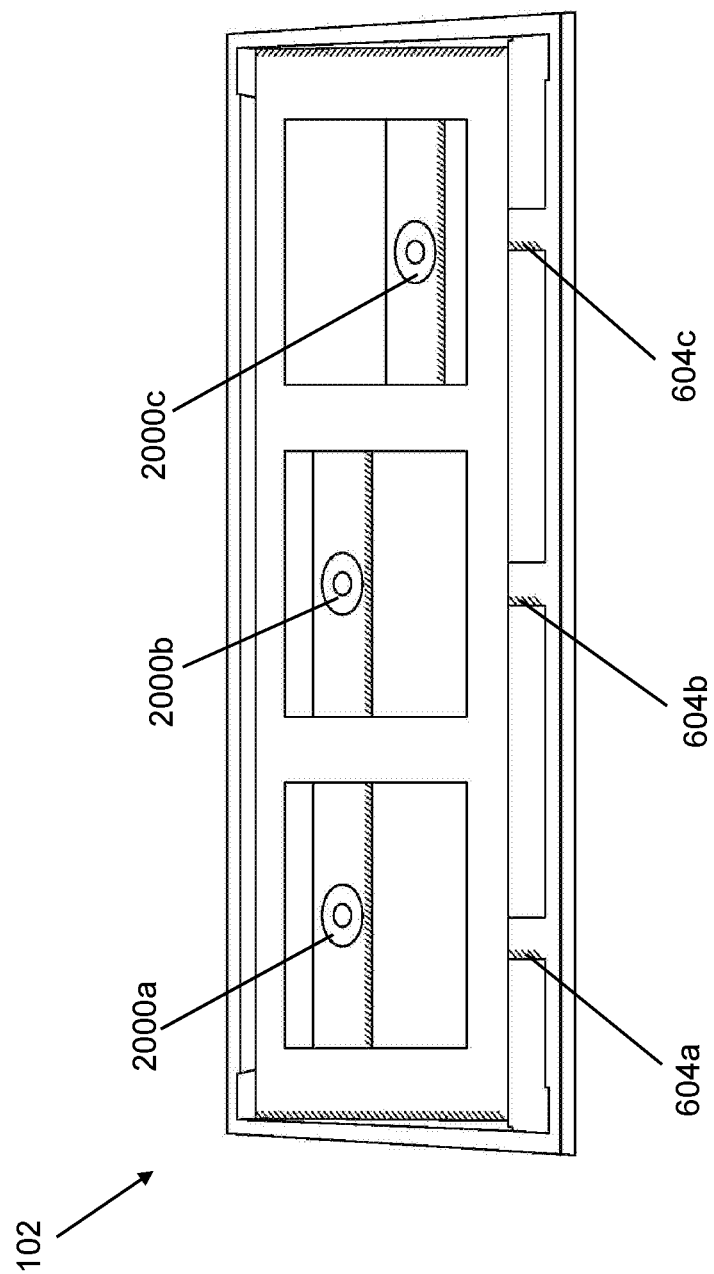
FIG. 20 is a top view of the base upper surface of the base with three lower magnets attached thereto, in accordance with the present invention.

In some embodiments, the cover 126 provides a passive infrared sensor 134 that is operably housed in the cover 126, and communicatively coupled to a sensor power source 1804. The passive infrared sensor 134 is operably configured to detect a motion proximal to the front sidewall 120. For example, a person passing in front of the front sidewall 120 of the aquarium assembly 100. In this manner, the detection of motion transmits an electric signal to the electric motor 1704 to place the shaft 1702 in the shaft rotation path 1712. This causes the pulley 1700 to direct the cable 132 in a manner that moves the faux human head 130 and creates motion thereto. In alternative embodiments, other types of motion or thermal sensors known in the art may also be used to detect motion or presence of a person, and actuate the faux human head 130 accordingly. For example, three faux human heads, e.g., zombie, As shown in FIG. 20, the aquarium assembly 100 further comprises a lower magnet 2000a-c disposed at the bottom of the base 102. In one non-limiting embodiment, one or more spaced-apart lower magnets 2000a-c may be used. Though any number of magnets and positions may be employed to generate a magnetic field, or a vector field that describes the magnetic influence of electrical currents and magnetized materials. One or more upper magnets may also be coupled to the cover 126 or embedded and coupled to the faux head 130, above the lower magnets 2000a-c, generate a magnetic flux that causes the faux head 130 to gyrate. Said another way, the lower and upper magnets 2000a-c are operably configured to generate a magnetic field through the aquarium cavity 202 to cause the faux head 130 to gyrate. In some embodiments, only the base 102 and the head 130 include the one or more magnets 2000a-c. In one non-limiting embodiment, the lower magnet(s) are discs having an exemplary dimension of approximately 2⅜"×1", and are larger than the upper magnet(s) shaped as discs and having an exemplary dimension of approximately 1"×0.5". Said magnets opposing one another are preferably of the same polarity facing one another and may generate a pull or push force of approximately 3-20 lbs. Dimensions outside of said ranges are possible as well depending on design constraints and restrictions and the magnets 2000*a-c* may be manually moved forward or backward by the user on the base 102 with respect to the head 130 hovering thereover, respectively, to adjust the level of gyration and/or rotation of the head 130. In another embodiment, the base magnets 2000*a-c* may be electrically and mechanically translated to achieve a desired level of gyration and/or rotation. A metallic material in the faux human head 130 gyrates in response to the magnetic field produced by the magnet(s), which in turn gyrates the faux human head 130.

Further, the aquarium assembly 100 further comprises a metallic material 136 that is disposed in the faux human head 130. The metallic material 136 may include iron, aluminum, steel, or other metal that is affected by magnetic fields produced by the magnet(s) above and/or below the faux head 130. The metallic material 136 may be detachably attached to the faux human head 130, or integrated therein. The metallic material 136 gyrates in response to the generated magnetic field, which consequently causes the faux human head 130 to gyrate.

Thus, the faux human head 130 is forced to move as the pulley 1700 and the cable 132 and hub are displaced to extend and retract. In this manner, the faux human head 130 is actuated to move in an up-and-down motion, a lateral motion, and a bobbing motion in response to the detected motion in the front of the aquarium assembly 100. The faux human head 130 is also actuated to gyrate in response to the metallic material 136, which respond to the generated magnetic field in the cover 126 and base 102.

Thus, the aquarium façade assembly 100 with encased faux human head 130 creates an animated visual effect through use of a transparent or translucent sidewalls; a base 102 with a mirror finish 110; LEDs shining on the mirror finish 110; a front façade chamber containing an aerated, bubbling liquid; and a suspended, yet moving faux human head 130. An aerator 300, at least one air tube 902*a-b*, and a liquid fill-drain aperture 906 that enhance aeration, circulation, and drainage for the liquid contained in the front façade chamber 900. This works to enhance the visual effect of the faux human head 130. A passive infrared sensor 134 detects motion near the front sidewall 120, and actuates motion of the faux human head 130 through a cable, pulley, and shaft mechanism.

Lower and/or upper magnets 2000*a-c* in the base 102 and cover 126 of the aquarium assembly 100 generate a magnetic field throughout the aquarium cavity 202. The magnetic field causes the metallic material 136 that is integrated in the faux human head 130 to gyrate. This causes the head 130 to gyrate accordingly. The aquarium assembly 100 may also utilize other, similar, electrical, faux human body parts, and aquarium-related structures and aquatic life to achieve a similar visual effect.

These and other advantages of the invention will be further understood and appreciated by those skilled in the art by reference to the following written specification, claims and appended drawings. Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An aquarium facade assembly with encased faux human head comprising:
    a base defining a bottom internal surface, having a left side, a right side, and a longitudinal length separating the left and right sides of the base;
    a left sidewall, a right sidewall, a rear sidewall, and a front sidewall coupled to one another and the base, the left, right, rear, and front sidewalls and the bottom internal surface defining an aquarium cavity enclosed by the left, right, rear, and front sidewalls,
    the sidewalls comprising a two-ply layer encapsulating a front facade chamber, the two-ply layer comprising a substantially transparent material,
    the front facade chamber forming at least one air tube aperture;
    an air tube disposed through the at least one air tube aperture, the air tube being fluidly coupled to the front facade chamber;
    an aerator fluidly coupled to the front facade chamber through the air tube, the aerator being operably configured to add air to a liquid and wherein the front facade chamber houses the liquid; and
    a cover selectively removably coupled to a sidewall upper surface of the left, right, rear, and front sidewalls.

2. The aquarium facade assembly according to claim 1, wherein the base further comprises:
    a plate-like panel coupled thereto.

3. The aquarium facade assembly according to claim 2, wherein:
    the plate-like panel spans the longitudinal length.

4. The aquarium facade assembly according to claim 3, wherein:
    the bottom internal surface of the base is defined by a mirror finish.

5. The aquarium facade assembly according to claim 4, wherein the two-ply layer further comprises:
    a lower surface coupled to the base and an opposing upper surface, the upper surface of the two-ply layer defining the at least one air tube aperture.

6. The aquarium facade assembly according to claim 5, wherein the two-ply layer further comprises:
    a liquid fill-drain aperture with a liquid fill tube disposed therein.

7. The aquarium facade assembly according to claim 1, wherein the air tube comprises:
    a proximal terminal end and a distal terminal end disposed within the liquid housed within the front facade chamber and disposed proximal to the lower surface of the two-ply layer.

8. The aquarium facade assembly according to claim 7, wherein:
    the lower surface of the two-ply layer has a cover tube assembly coupled thereto, the cover tube assembly including at least one cover tube distal end operably configured to engage with the proximal terminal end of the air tube in a hermetically sealed configuration.

9. The aquarium facade assembly according to claim 1, wherein:
    the left and right sidewalls are of a substantially transparent material.

10. The aquarium facade assembly according to claim 1, wherein:

the cover houses the aerator.

11. The aquarium facade assembly according to claim 1, wherein:
the cover further comprises a series of plurality of LEDs housed therein and facing the aquarium cavity to shine light therein.

12. The aquarium facade assembly according to claim 1, wherein the cover further comprises:
a cable with a cable distal end coupled to a faux human head disposed within the aquarium cavity and suspended above the bottom internal surface of the base;
an electric motor operably coupled to a shaft, directly coupled to the cable at a cable-shaft coupling junction, and operably configured to rotate in a shaft rotation path, the cable defining an operable cable length spanning from the cable distal end to the cable-shaft coupling junction; and
a pulley directly coupled to the cable along the operable cable length, wherein the shaft rotation path generates an up-and-down path of the faux human head through the cable.

13. The aquarium facade assembly according to claim 12, wherein the cover further comprises:
a passive infrared sensor operably housed in the cover, the passive infrared sensor communicatively coupled to the electric motor, the passive infrared sensor operably configured to detect a motion proximal to the front sidewall, wherein the detection of motion transmits an electric signal to the electric motor to place the shaft in the shaft rotation path.

14. The aquarium facade assembly according to claim 13, further comprising:
a lower magnet at the base and an upper magnet at the cover, the first and upper magnet generating a magnetic field through the aquarium cavity.

15. The aquarium facade assembly according to claim 14, further comprising:
a metallic material disposed in the faux human head, the metallic material gyrating in response to the generated magnetic field.

16. An aquarium façade assembly with encased faux human head comprising:
a base defining a bottom internal surface, having a left side, a right side, and a longitudinal length separating the left and right sides of the base;
a plate-like panel coupled to the base, the plate-like panel spanning the longitudinal length of the base, the plate-like panel comprising a back panel guide extending longitudinally across the plate-like panel, the plate-like panel further comprising a back panel guide configured to help align the plate-like panel to the base;
a left sidewall, a right sidewall, a rear sidewall, and a front sidewall coupled to one another and the base, the left, right, rear, and front sidewalls and the bottom internal surface defining an aquarium cavity enclosed by the left, right, rear, and front sidewalls,
the sidewalls comprising a two-ply layer encapsulating a front facade chamber, the two-ply layer comprising a substantially transparent material, the two-ply layer further comprising a liquid fill-drain aperture with a liquid fill tube disposed therein,
the front facade chamber forming at least one air tube aperture, the front facade chamber housing a liquid;
multiple corner brackets disposed between the edges of the sidewalls;
an air tube disposed through the at least one air tube aperture, the air tube being fluidly coupled to the front facade chamber;
an aerator fluidly coupled to the front facade chamber through the air tube, the aerator being operably configured to add air to the liquid;
a cover selectively removably coupled to a sidewall upper surface of the left, right, rear, and front sidewalls;
a series of plurality of LEDs housed in the cover, the plurality of LEDs facing the aquarium cavity to shine light therein;
a cable with a cable distal end coupled to a faux human head disposed within the aquarium cavity and suspended above the bottom internal surface of the base;
an electric motor operably coupled to a shaft, directly coupled to the cable at a cable-shaft coupling junction, and operably configured to rotate in a shaft rotation path, the cable defining an operable cable length spanning from the cable distal end to the cable-shaft coupling junction;
a pulley directly coupled to the cable along the operable cable length, wherein the shaft rotation path generates an up-and-down path of the faux human head through the cable;
a passive infrared sensor operably housed in the cover, the passive infrared sensor communicatively coupled to the electric motor, the passive infrared sensor operably configured to detect a motion proximal to the front sidewall, wherein the detection of motion transmits an electric signal to the electric motor to place the shaft in the shaft rotation path;
a lower magnet at the base and an upper magnet at the cover, the first and upper magnet generating a magnetic field through the aquarium cavity, the lower magnet being larger than the upper magnet; and
a metallic material disposed in the faux human head, the metallic material gyrating in response to the generated magnetic field.

17. The aquarium façade assembly according to claim 16, wherein:
the bottom internal surface of the base is defined by a mirror finish.

18. The aquarium façade assembly according to claim 16, wherein the two-ply layer further comprises:
a lower surface coupled to the base and an opposing upper surface, the upper surface of the two-ply layer defining the at least one air tube aperture.

19. An aquarium façade assembly with encased faux human head comprising:
a base defining a bottom internal surface, having a left side, a right side, and a longitudinal length separating the left and right sides of the base;
a left sidewall, a right sidewall, a rear sidewall, and a front sidewall coupled to one another and the base, the left, right, rear, and front sidewalls and the bottom internal surface defining an aquarium cavity enclosed by the left, right, rear, and front sidewalls,
the sidewalls comprising a two-ply layer encapsulating a front facade chamber, the two-ply layer comprising a substantially transparent material,
the front facade chamber forming at least one air tube aperture;
an air tube disposed through the at least one air tube aperture, the air tube being fluidly coupled to the front facade chamber;

an aerator fluidly coupled to the front facade chamber through the air tube, the aerator being operably configured to add air to a liquid;
a cover selectively removably coupled to a sidewall upper surface of the left, right, rear, and front sidewalls;
a cable with a cable distal end coupled to a faux human head disposed within the aquarium cavity and suspended above the bottom internal surface of the base;
an electric motor operably coupled to a shaft, directly coupled to the cable at a cable-shaft coupling junction, and operably configured to rotate in a shaft rotation path, the cable defining an operable cable length spanning from the cable distal end to the cable-shaft coupling junction; and
a pulley directly coupled to the cable along the operable cable length, wherein the shaft rotation path generates an up-and-down path of the faux human head through the cable.

20. The aquarium facade assembly according to claim 19, wherein the cover further comprises: a passive infrared sensor operably housed in the cover, the passive infrared sensor communicatively coupled to the electric motor, the passive infrared sensor operably configured to detect a motion proximal to the front sidewall, wherein the detection of motion transmits an electric signal to the electric motor to place the shaft in the shaft rotation path.

* * * * *